United States Patent

Ghorashi et al.

Patent Number: 5,202,187
Date of Patent: Apr. 13, 1993

[54] COATED WIRE

[75] Inventors: Hamid M. Ghorashi, Midlothian, Va.; John C. Norman, Wilmington, Del.

[73] Assignee: E. I. Du Pont de Nemours and Company, Wilmington, Del.

[21] Appl. No.: 508,863

[22] Filed: Apr. 12, 1990

[51] Int. Cl.$^5$ .............. B32B 15/00; B32B 15/02; B32B 15/20
[52] U.S. Cl. .............. 428/379; 428/375; 428/401; 528/324; 528/329.1; 174/110 SR; 174/110 N
[58] Field of Search .......... 428/379, 364, 401; 528/324, 329.1, 183, 184

[56] References Cited

U.S. PATENT DOCUMENTS

| | | | |
|---|---|---|---|
| 3,753,998 | 8/1973 | Morello | 524/879 |
| 3,816,347 | 6/1974 | Luh | 252/511 |
| 3,904,589 | 9/1975 | Radlmann et al. | 528/324 |
| 4,072,664 | 2/1978 | Konomi et al. | 528/329.1 |
| 4,081,430 | 3/1978 | Minami et al. | 528/348 |
| 4,207,411 | 6/1980 | Shue | 528/324 |
| 4,398,012 | 8/1983 | Merrill et al. | 528/324 |
| 4,420,535 | 12/1983 | Walrath et al. | 428/379 |
| 4,471,022 | 9/1984 | McGregor et al. | 428/379 |
| 4,505,978 | 3/1985 | Smith | 428/379 |
| 4,654,263 | 3/1987 | Cox | 428/366 |
| 4,876,316 | 10/1989 | Lavallee | 428/379 |
| 4,898,896 | 2/1990 | Maj et al. | 528/324 |
| 4,999,395 | 3/1991 | Croman et al. | 524/807 |
| 5,066,445 | 11/1991 | Dunlap et al. | 528/324 |
| 5,077,125 | 12/1991 | Croman et al. | 528/183 |

FOREIGN PATENT DOCUMENTS

| | | | |
|---|---|---|---|
| 0012490 | 1/1979 | Japan | 428/379 |
| 84323 | 6/1980 | Japan | 528/324 |
| 6219227 | 11/1985 | Japan | 528/324 |

*Primary Examiner*—Patrick J. Ryan
*Assistant Examiner*—J. M. Gray

[57] ABSTRACT

Copper wire insulated with a certain copolyamide sheath is stable to high temperatures and is resistant to water crazing, cracking and loss of coating.

3 Claims, 1 Drawing Sheet

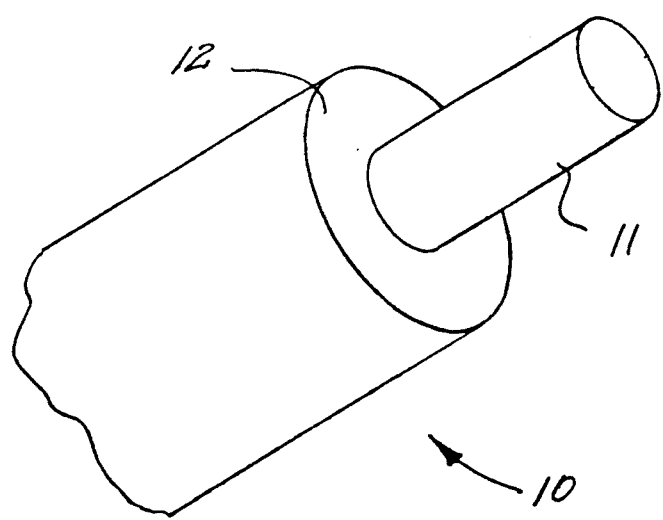

COATED WIRE

BACKGROUND OF THE INVENTION

Current commercial processes for coating metal wire include film coating, paper coating, solvent dip systems etc. This invention pertains to melt coated metal wire. Products prepared by melt coating a resin on magnet copper wire have often had deficiencies such as water crazing, marginal polymer flexibility and poor stability at high temperatures. Oftentimes cracking or loss of coating with breakdown of electrical insulation occurs when the coated wire is formed into shapes with sharp bending angles and turning radii.

DRAWINGS

The FIGURE is a schematic representation of a typical insulated wire of the invention.

SUMMARY OF THE INVENTION

This invention provides a metallic electrical wire, such as copper, insulated with an adherent sheath comprising a polymer consisting essentially of the following repeating units:

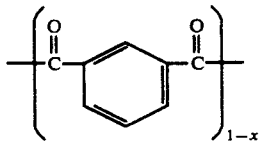

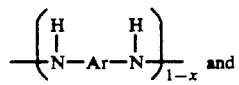

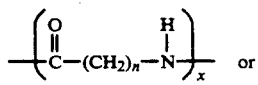

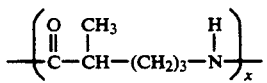

wherein n is 4 or 5; X is from 0.01 to 0.50; and Ar is at least one divalent aromatic radical of the group consisting of 1,3-phenylene, 1-methyl-2,4-phenylene and 3,4'-oxydiphenylene or a mixture of members of said group, and to a process for preparing the insulated wire.

DETAILED DESCRIPTION OF THE INVENTION

Coated copper wire having an adherent coating which is resistant to water crazing and is stable to high temperatures is desired for many applications such as magnet wire. Applicant has invented an insulated wire possessing these characteristics to a substantial degree. The coating comprises a polymer of the group disclosed in copending, coassigned U.S. application No. 07/402,295 to Singh filed Sep. 5, 1989. The polymers consist essentially of the following repeat units:

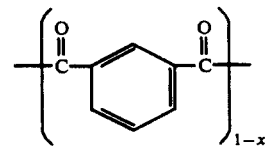

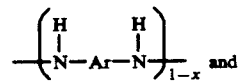

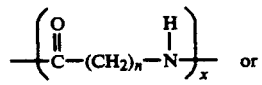

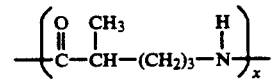

wherein n is 4 or 5; X is from 0.01 to 0.50; and Ar is at least one divalent aromatic radical of the group consisting of 1,3-phenylene, 1-methyl-2,4-phenylene, and 3,4'-oxydiphenylene or a mixture of members of said group, and are prepared by reacting in substantially equimolar proportions and at a temperature of from 180° C. to 280° C., aromatic diamine of the group of meta-phenylene diamine, 1-methyl-2,4-phenylene diamine and 3,4'-diaminodiphenylether or mixtures thereof with an N,N'-isophthaloyl bis(caprolactam), N,N'-isophthaloyl bis(valerolactam) and N,N'-isophthaloyl bis(3-methyl-valerolactam), in which the bis(lactam) has a carboxyl content of less than 30 meq. (microequivalents) of carboxyl groups per g.

As prepared, the polymers contain varying amounts of free lactam which acts as a plasticizer. It is preferred that the lactam content be reduced to levels below 7% by wt. before use as the coating. Lactam removal can be achieved by vacuum extraction or by other means.

Copper wires suitable for preparing the insulated wires can be those conventionally employed for particular electrical applications. Generally, the coating is from 1 to 10 mils thick and the coated wires range from 40 to 60 mils in thickness.

Typically the coated wire is produced as follows: Polymer flake is fed to a screw extruder. Bare copper wire, preheated to a temperature in excess of the glass transition temperature, Tg, of the polymer to be coated on the wire, is fed continuously to and through a die port and the molten polymer from the melt-extruder is deposited through an annulus around and onto the copper wire. Failure to preheat the wire to a temperature in excess of the Tg of the polymer produced poor results.

DETAILS OF THE DRAWING

Referring to the drawing, there is shown a typical construction for an insulated wire 10 comprising a metal conductive element or wire 11 and an overlying polymer sheath 12, covering the conductor.

TEST PROCEDURES

A series of tests were employed to check coating quality and adhesion to copper. The coated wire was bent around a mandrel to form coils of one half to one sixteenth inch in diameter. The coils which were about 1 inch long were placed in a beaker of water with the ends of the wire above the surface of the water. One electrode from the 9 volt direct current potential source was placed in the water and another electrode was attached at a bare end of the copper wire. A meter was included in the circuit to detect passage of current. No conductivity through water was observed when the coating was of good quality.

Another test employed to check coating adhesion and quality was to examine the coating after the coils were heated in an oven for from 30 minutes to several days at temperatures above the Tg of the polymer, often as high as 250° C. Good quality coatings maintain integrity, properties, dimensions and appearance.

The following example is intended to illustrate the invention and is not to be construed as limiting.

EXAMPLE

In this example, 3,4'-diaminodiphenyl ether (3,4'-DDE) was reacted with an essentially equimolar quantity of N,N'-isophthaloyl bis-valerolactam (IBV) to form a copolymer plasticized with valerolactam and most of the valerolactam was then removed. A copper wire was then melt-coated with the copolymer, and the coated wire was tested for the effectiveness of its electrical insulation.

Into a supply tank, equipped with an agitator and adapted to deliver its contents to an autoclave, also equipped with an agitator, was placed 15,000 g (75 mols) of 3,4'-DDE and 24,625 g (75.08 mols, 1.001 equiv.) of IBV with 1.3 microequivalents meq.) of carboxyl per g. The reaction mixture so prepared was thoroughly purged of air by pressurizing the tank ten times with nitrogen at 173 kPa (25 psig) and bleeding the pressure back each time to atmospheric pressure. The tank was then placed under vacuum at an absolute pressure of 6.7 kPa (50 torr), heated to 60° C., and allowed to stand overnight at that temperature. Maintaining the mixture under vacuum, it was then heated in the tank to about 130° C., at which time the agitation was started. Heating was continued to 200° C. while maintaining vacuum and continuing agitation. The tank was then pressurized with nitrogen to about 14 kPa (2 psig) and the autoclave was heated to and maintained at a temperature of 200° C. The autoclave was evacuated to 6.7 kPa (50 torr), after which the hot reaction mixture was transferred to the autoclave, and the autoclave was then pressurized with nitrogen at 14 kPa (2 psig). The autoclave was heated to 250° C. with continued agitation; then, the agitator was stopped and the reaction mixture was held at 250° C. for four hours. The pressure was then increased to 345 kPa (50 psig) and the molten contents of the autoclave were extruded. The copolymeric contents were cooled, cut to flake, and dried at 60° C. under a pressure of 3.4 kPa (25 torr). The copolymeric product was found to have an inherent viscosity of about 0.7, measured in a solution of dimethylacetamide containing 4 wt. % lithium chloride. The proton-NMR spectrum of the copolymer showed that it contained 4.9 wt. % (14.66 mol %) of —C(=O)—(CH$_2$-)$_4$—NH— repeat units in the copolymer chain, and that the copolymer was plasticized with about 20 wt. % free valerolactam.

The plasticized copolymer was fed through a vacuum extraction extruder to lower the free lactam level to about 4 wt. %. The extracted copolymer so produced was converted into flake form and used as a supply to feed a 3.18 cm (1.25 in) wire coating machine (Model #EC1250-39 copper wire coating machine, available from the Entwistle Co., Hudson, Mass. 01749). The copolymer flake was fed at a screw temperature profile of 249° C. to 293° C. and a screw speed of 2 revolutions per minute. Copper wire having a diameter of about 1 mm (0.041 in) was preheated to a temperature of about 216° C. (420° F.) and fed at a speed of 76.2 m/min (250 ft./min) at a die temperature of about 282° C. (540° F.) with an average melt temperature of 310° C. 590° F.). The wire temperature of 216° C. is above the Tg of the plasticized polymer used in this example. The barrel pressure under these conditions of operation was 10.3–17.2 MPa (1500–2500 psi). The thickness of the copolymer coating on the coated copper wire was about 0.64 mm (2.5 mils).

To check the quality of the copolymer coating on the wire and the adhesion of the copolymer coating on the copper, the coated wire was bent to form coils having a length of about 2.5 cm (1 in) and a diameter of 1.6 mm (1/16 in). The coils were then placed in a beaker of water. A live electrode was connected with bare copper at one end of the coil, and another electrode was placed in contact with the water in the beaker. No conductivity through the water was observed. The dielectric strength of the coated wire in air, in oil, and in water was tested and observed to be as follows:

| Test Condition | Volts (Average) |
|---|---|
| In Air | 7300 |
| In Oil | 8420 |
| In Water | 6430 |

Dielectric Strength was determined using ASTM - D 30032.

The coils of coated wires were further tested by heating them in an oven at 250° C. for 30 minutes. Upon cooling, the coils were again tested by placing them in a beaker of water with one end of the coil attached to a live electrode and another electrode placed in contact with the water. Again no conductivity through the water was observed. The test was repeated by heating coils of coated wire at 200° C. for 5 days and testing for conductivity as before. No conductivity was noted.

We claim:

1. A metallic wire insulated with a melt-coated adherent sheath comprising a polymer consisting essentially of the following repeat units:

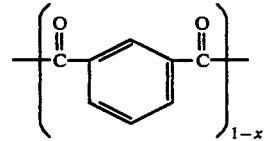

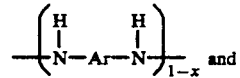

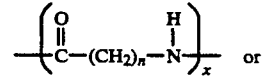

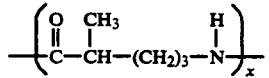

wherein n is 4 or 5; X is from 0.01 to 0.50; and Ar is at least one divalent aromatic radical selected from the group consisting of 1,3-phenylene, 1-methyl-2,4-phenylene and 3,4'-oxydiphenylene.

2. The wire of claim 1 wherein the wire is copper.

3. The wire of claim 1 wherein the sheath has a thickness of from 1 to 10 mils.

* * * * *